Sept. 22, 1931.   H. F. AMES   1,824,525

TRACTION DEVICE

Filed March 30, 1929

Witness:
Geo L Chapel

INVENTOR
Harold F. Ames,
BY Rice, Rice & Hann
ATTORNEYS

Patented Sept. 22, 1931

1,824,525

UNITED STATES PATENT OFFICE

HAROLD F. AMES, OF GRAND RAPIDS, MICHIGAN

TRACTION DEVICE

Application filed March 30, 1929. Serial No. 351,378.

This invention relates to traction and antiskid devices.

The main objects of this invention are to provide an improved traction device particularly suitable for automobile tires; to provide an improved device which when applied to a vehicle wheel will effectively prevent skidding on icy or other slippery surfaces; to provide a traction and anti-skid device which will give a maximum of gripping efficiency on the ground with a minimum of wear and tear on a vehicle tire to which it is applied; to provide an improved device of this character which will present a sharp metallic face to the surface of the ground and a soft yielding cushion contact against the automobile tire to which it is applied, and to provide an improved device of this character which has removable and replaceable metal calks so that when they become worn, new ones may be put in to renew the life of the device.

An illustrative embodiment of this invention is shown in the accompanying drawings, in which.

Figure 1:
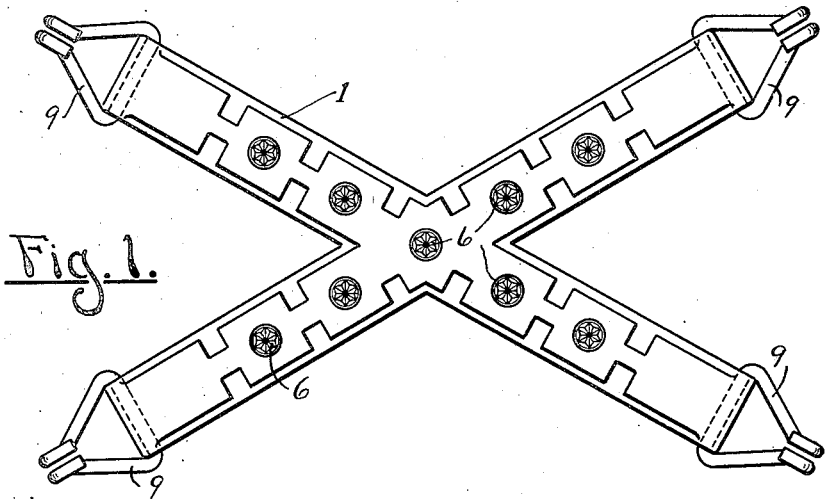
Fig. 1 is a plan view of the preferred embodiment of my invention.

At the present time metal chains are most commonly used on automobile tires for securing traction in a slippery, muddy or icy place and for preventing skidding of the vehicle, although the ordinary tire chain actually is practically ineffective for preventing sidewise skidding. The biggest difficulty experienced in the use of tire chains however is that they tend to quickly wear out the tire upon which they are placed and in some instances tear up the tread of the tire, also the cross bars of the ordinary tire chains soon wear out especially if the vehicle is driven a short distance over a cement or concrete road. When a cross bar breaks the loose ends thereof usually bang and strike against the fender, tearing at the chain itself and becoming a general nuisance.

More recently, cross bars for tire chains have been made from rubber reinforced with either fabric or flexible wires, the object being to cause less wear and damage to the tires upon which they are placed. These rubber covered cross bars however are extremely inefficient especially on ice although they are nearly as equally ineffective on wet asphalt, wet clay and the like.

In my present invention all of the difficulties of the prior art devices have been overcome and the good features of securing positive traction on icy or other slippery surfaces are secured. This is accomplished by having a reinforced rubber cross bar which carries a plurality of spaced rigid metal plates into which are detachably threaded a plurality of metal calks with the ends thereof projecting from the top surface of the cross bar so as to bite into the ground, ice, or other surfaces upon which it is used.

In the construction shown in the drawings, a cross bar 1 of X-shape is formed of a plurality of wires 2 which are embedded within a coating of rubber 3. The wires 2 carry a plurality of metal plates 4 in spaced relation to one another and which may be made in two parts with one-half placed on each side of the wires and then the wires and plates spot welded in a rigid unit. The center of the plates 4 are drilled and tipped to receive the threaded shanks 5 of metal calks 6 which are mounted on the plates 4 with the ends thereof projecting above the top surface of the cross bar or strap. A lock washer 7 may be provided underneath the calk for preventing its accidentally unthreading and the inner end of the shank is preferably provided with a transversely disposed slot 8 for receiving the end of a screw driver so that the calk may be tightly screwed into the plate or removed therefrom when worn out.

In the embodiment shown in Fig. 1 the end of the straps are provided with conventional type hooks 9 in the same manner as the chain cross bars of an ordinary skid chain so that a plurality of these units may be made up into a chain which extends completely around an automobile tire.

Figure 2:
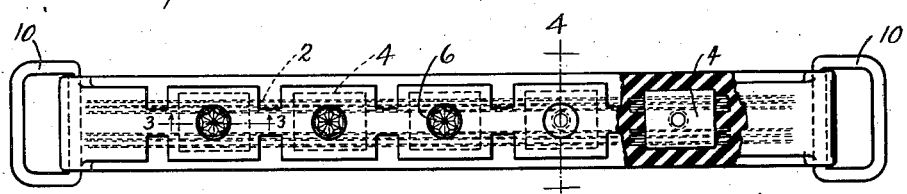
Fig. 2 is a plan view of a modified form with the embedded wires and metal plates shown in dotted outline and with a portion thereof broken away to show the interior arrangement.
Figure 3:
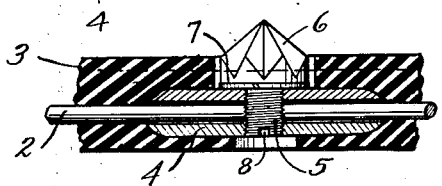
Fig. 3 is an enlarged sectional view taken on the line 3—3 of Fig. 2.

In the embodiment shown in Fig. 2 of the drawings, the invention is shown in the form of a single strap having D-rings 10 in the opposite ends thereof, this type being particularly suitable for securing by individual leather straps or the like at various points about a tire.

Figure 4:
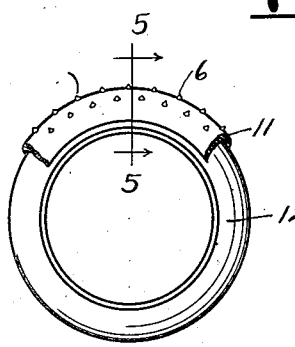
Fig. 4 is a view showing a modified embodiment of my invention as applied to a tire protector which substantially completely covers the tire.
Figure 5:
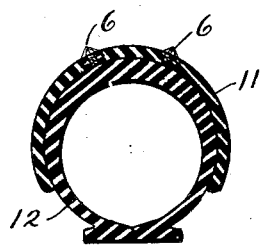
Fig. 5 is an enlarged longitudinal sectional view taken on the line 5—5 of Fig. 4.
Figure 6:
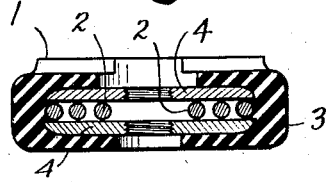
Fig. 6 is an enlarged transverse sectional view taken on the line 4—4 of Fig. 2.

In Figs. 4 and 5 of the drawings, the invention is shown in the form of an auxiliary tread 11 which substantially completely covers the exposed surface of an automobile tire 12.

Although several embodiments of this invention have been herein shown and described, it will be understood that numerous details of the construction shown may be altered or omitted without departing from the spirit of this invention as defined by the following claims.

I claim:

1. An anti-skid device comprising a strap member adapted to lie across the tread of a wheel, the said strap member having a flexible wire core, a pair of base plates embracing opposite sides of said wire core, a calk having a shank extending through said base plates for securing them to said core, said core and plates being imbedded in a surrounding covering of rubber and securing means on the ends of said strap.

2. An anti-skid device comprising a strap member adapted to lie across the tread of a wheel, the said strap member having a flexible wire core, a pair of base plates embracing opposite sides of said wire core, a calk having a shank threaded through said base plates for securing them to said core, said core and plates being embedded in a surrounding covering of rubber, the inner end of said calk shank being accessible from the back of said strap, means on the accessible end of said shank for engaging with a tool to rotate said calk and shank and securing means on the ends of said strap.

3. An antiskid device comprising a strap member adapted to lie across the tread of a wheel, the said strap member having a flexible wire core, a pair of base plates positioned on opposite sides of said core for holding said core in predetermined position within a mould, said core and base plates being moulded in a surrounding covering of rubber, a calk removably mounted on said base plate and securing means on the ends of said strap.

In testimony whereof I have hereunto set my hand at Grand Rapids, Michigan, this 26th day of March, 1929.

HAROLD F. AMES.